United States Patent
Sweetman et al.

(10) Patent No.: US 10,752,792 B2
(45) Date of Patent: Aug. 25, 2020

(54) FLUORINATED ESTER COMPOUND ADDITIVES FOR ARCHITECTURAL COATINGS

(71) Applicant: THE CHEMOURS COMPANY FC, LLC, Wilmington, DE (US)

(72) Inventors: Karl Jeffery Sweetman, Wilmington, DE (US); Roman B. Larichev, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 176 days.

(21) Appl. No.: 16/080,775

(22) PCT Filed: Feb. 28, 2017

(86) PCT No.: PCT/US2017/019912
§ 371 (c)(1),
(2) Date: Aug. 29, 2018

(87) PCT Pub. No.: WO2017/151593
PCT Pub. Date: Sep. 8, 2017

(65) Prior Publication Data
US 2019/0055419 A1 Feb. 21, 2019

Related U.S. Application Data

(60) Provisional application No. 62/302,885, filed on Mar. 3, 2016.

(51) Int. Cl.
| | | |
|---|---|---|
| C09D 7/63 | (2018.01) |
| C09D 5/02 | (2006.01) |
| C09D 5/00 | (2006.01) |
| C09D 167/00 | (2006.01) |
| C09D 7/61 | (2018.01) |
| C09D 163/00 | (2006.01) |
| C09K 5/10 | (2006.01) |
| C08K 5/11 | (2006.01) |
| C08K 5/10 | (2006.01) |
| C09D 133/08 | (2006.01) |
| C08K 5/103 | (2006.01) |
| C09K 5/06 | (2006.01) |

(52) U.S. Cl.
CPC ............ *C09D 7/63* (2018.01); *C09D 5/00* (2013.01); *C09D 5/024* (2013.01); *C09D 7/61* (2018.01); *C09D 133/08* (2013.01); *C09D 163/00* (2013.01); *C09D 167/00* (2013.01); *C08K 5/10* (2013.01); *C08K 5/103* (2013.01); *C08K 5/11* (2013.01); *C09K 5/06* (2013.01); *C09K 5/10* (2013.01)

(58) Field of Classification Search
None
See application file for complete search history.

(56) References Cited

U.S. PATENT DOCUMENTS

| | | | | |
|---|---|---|---|---|
| 3,096,363 A * | 7/1963 | Ballard et al. | C10M 105/54 |
| | | | 560/122 |
| 3,231,604 A * | 1/1966 | Brace | C07C 59/60 |
| | | | 560/183 |
| 3,248,419 A * | 4/1966 | Milton Braid | C08G 63/68 |
| | | | 560/227 |
| 3,952,075 A * | 4/1976 | Nakamura | A62D 1/0085 |
| | | | 558/186 |
| 5,023,362 A * | 6/1991 | Krespan | C07D 319/12 |
| | | | 558/449 |
| 8,022,107 B2 * | 9/2011 | Murphy | C08G 65/007 |
| | | | 252/88.2 |
| 2006/0135673 A1 * | 6/2006 | Temperante | C08K 5/435 |
| | | | 524/463 |
| 2007/0212491 A1 | 9/2007 | Yen | |
| 2008/0220354 A1 * | 9/2008 | Miyakawa | G03G 5/14791 |
| | | | 430/66 |
| 2015/0185606 A1 | 7/2015 | Kitagawa | |

FOREIGN PATENT DOCUMENTS

| | | | | | |
|---|---|---|---|---|---|
| GB | 926412 A | * | 5/1963 | | C07C 17/04 |
| JP | 2010235860 A | * | 10/2010 | | |
| JP | 2011084048 A | * | 4/2011 | | |
| WO | WO-2014023397 A2 | * | 2/2014 | | C08K 5/521 |

OTHER PUBLICATIONS

Machine translation of JP 2010235860 A, retrieved Apr. 2020 (Year: 2020).*
Internatioal Search Report and Written Opinion issued in PCT/US2017/019912 dated May 15, 2017, 10 pages.
*Outlines of Paint Technology* (Halstead Press, New York, NY, Third edition, 1990).
C. R. Martens in "Emulsion and Water-Soluble Paints and Coatings" (Reinhold Publishing Corporation, New York, NY, 1965).
*Surface Coatings vol. I, Raw Materials and Their Usage* (Chapman and Hall, New York, NY, Second Edition, 1984).

* cited by examiner

*Primary Examiner* — Nicole M. Buie-Hatcher

(57) ABSTRACT

The present invention is a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

$$[A\!-\!]_a Y\!\!-\!\![(CH_2)_x\text{-}Q\text{-}Z\!\!-\!\!(CH_2)_y\!\!-\!\!R_f]_t \qquad (I)$$

where A is independently —OH, a $C_1$-$C_{18}$ alkyl, —$CH_2OH$, —$CH_2COOH$, or $(CH_2CH_2O)_a(CH_2CH(CH_3)O)_bH$; a and b are independently 0 to 3, where a+b is 1 to 3; s is 0 to 2; Y is a linear or branched alkylene organic group having t+s substitutions; x is 0 or 1; Q is —C(O)O— or —OC(O)—; Z is —$(CH_2)_y$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms; and t is 2 to 6, such that s+t is 2 to 6.

15 Claims, No Drawings

FLUORINATED ESTER COMPOUND ADDITIVES FOR ARCHITECTURAL COATINGS

This application represents a national filing under 35 U.S.C. 371 of International Application No. PCT/US2017/019912 filed Feb. 28, 2017, and claims priority of U.S. Provisional Application No. 62/302,885 filed Mar. 3, 2016.

FIELD OF THE INVENTION

This invention relates to a composition comprising a coating base and a fluorinated ester compound for use in architectural coating compositions such as water-based latex paints, to provide durable surface effects.

BACKGROUND OF THE INVENTION

The coating compositions of interest in the present invention include alkyd coating compositions, urethane coating compositions, water-dispersible coating compositions, and unsaturated polyester coating compositions, typically a paint, clear coating, or stain. All of the above-listed coating compositions after drying or curing often show low hexadecane contact angles, are readily wetted by oil, and are susceptible to soiling. The coating compositions are described in *Outlines of Paint Technology* (Halstead Press, New York, N.Y., Third edition, 1990) and *Surface Coatings Vol. I, Raw Materials and Their Usage* (Chapman and Hall, New York, N.Y., Second Edition, 1984).

Water-based latex coating bases, such as those employed as paint coatings, have a tendency to have low oil repellency and poor cleanability ratings. To impart better cleanability to interior and exterior paint surfaces, small molecule additives, including fluorosurfactants, have been used. However, the additives do not provide long-term performance and durability in exterior paint, which is subjected to more extreme environmental conditions. The additives can wash away from the coating surface within a few days.

BRIEF SUMMARY OF THE INVENTION

The present invention addresses the issues described above by introducing fluorinated ester compounds. The compounds are small enough to migrate to the coating surface while wet but stable enough to withstand being subjected to harsh elements. The ether and/or thioether groups of the present fluorinated ester compounds provide a hydrolytic stability that provides a performance benefit over the known fluorinated ester compounds. The compositions of the present invention provide performance as well as durability to the water-based latex coatings. They impart unexpectedly desirable surface effects such as: increased water and oil contact angles, enhanced dirt pickup resistance, and enhanced cleanability to the coating films.

The present invention relates to a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

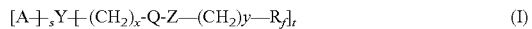

where A is independently —OH, a $C_1$-$C_{18}$ alkyl, —$CH_2OH$, —$CH_2COOH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having t+s substitutions, optionally interrupted by ether oxygen —O— and optionally having one or more alkoxylate linking groups that bond with A or $[(CH_2)_x$-Q-Z—$(CH_2)_y$—$R_f]$; x is 0 or 1; Q is —C(O)O— or —OC(O)—; Z is —$(CH_2)_s$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; and t is 2, 3, 4, 5, or 6, such that s+t is 2 to 6.

The present invention further comprises an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

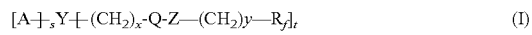

where A is independently —OH, a $C_1$-$C_{18}$ alkyl, —$CH_2OH$, —$CH_2COOH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having t+s substitutions, optionally interrupted by ether oxygen —O— and optionally having one or more alkoxylate linking groups that bond with A or $[(CH_2)_x$-Q-Z—$(CH_2)_y$—$R_f]$; x is 0 or 1; Q is —C(O)O— or —OC(O)—; Z is —$(CH_2)_s$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; and t is 2, 3, 4, 5, or 6, such that s+t is 2 to 6.

DETAILED DESCRIPTION OF THE INVENTION

Herein trademarks are shown in upper case.

The terms "(meth)acrylic" or "(meth)acrylate" indicate, respectively, methacrylic and/or acrylic, and methacrylate and/or acrylate; and the term (meth)acrylamide indicates methacrylamide and/or acrylamide.

By the term "alkyd coating" as used hereinafter is meant a conventional liquid coating based on alkyd resins, typically a paint, clear coating, or stain. The alkyd resins are complex branched and cross-linked polyesters containing unsaturated aliphatic acid residues.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D16 into five categories. Type I urethane coatings contain a minimum of 10% by weight of a pre-reacted autoxidizable binder, characterized by the absence of significant amounts of free isocyanate grous. These are also known as uralkyds, urethane-modified alkyds, oil-modified urethanes, urethane oils, or urethane alkyds. Type I urethane coatings are the largest volume category of polyurethane coatings and include paints, clear coatings, or stains. The cured coating for a Type I urethane coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, stain, or gel coat formulation.

By the term "water-dispersed coatings" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. For latex paints the film forming material is a latex polymer of acrylate acrylic, styrene acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "coating base" as used herein is meant a liquid formulation of a water-dispersed coating, an epoxy polymer coating, an alkyd coating, a Type I urethane coating, or an unsaturated polyester coating, which is later applied to a substrate for the purpose of creating a lasting film on said surface. The coating base includes those solvents, pigments, fillers, and functional additives found in a conventional liquid coating. For example, the coating base formulation may include a polymer resin and pigment dispersed in water, where the polymer resin is an acrylic polymer latex, vinyl-acrylic polymer, vinyl polymer, Type I urethane polymer, alkyd polymer, epoxy polymer, or unsaturated polyester polymer, or mixtures thereof.

By the structure $(CH_2CH_2O)_a(CH_2CH(CH_3)O)_bH$ or $—(CH_2CH_2O)_m(CH_2CH(CH_3)O)_n—$, it is intended that the ethylene oxide (EO) and propylene oxide (PPO) units may be present in any random or block order. For example, the unit order could be EO-EO-EO, EO—PPO, PPO-EO, PPO-EO—PPO, PPO—PPO-EO-EO, EO-EO-PPO, etc.

By the term "Y is a linear or branched alkylene organic group having t+s substitutions, optionally interrupted by ether oxygen —O— and optionally having one or more alkoxylate linking groups that bond with A or $[(CH_2)_x$-Q-Z—$(CH_2)_y$—$R_f]$", it is meant that Y is either divalent (linear) or has a number of branches, where the number of branches is equal to t+s. Y is alkylene but may have an ether oxygen, such as those from dipentaerythritol or ditrimethylol propane, and/or Y may have one or more alkoxylate linking groups, such as from the reaction of a polyol with an alkoxylate. In one embodiment, the one or more alkoxylate linkages have 1, 2, or 3 alkoxylate repeat units. The number of alkoxylate substitutions and number of alkoxylate repeat units can be varied and may depend on the amount of alkoxylate used.

The present invention relates to a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

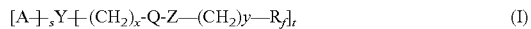

$$[A]_sY[—(CH_2)_x\text{-}Q\text{-}Z—(CH_2)_y—R_f]_t \quad (I)$$

where A is independently —OH, a $C_1$-$C_{18}$ alkyl, —$CH_2$OH, —$CH_2$COOH, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having t+s substitutions, optionally interrupted by ether oxygen —O— and optionally having one or more alkoxylate linking groups that bond with A or $[(CH_2)_x$-Q-Z—$(CH_2)_y$,—$R_f]$; x is 0 or 1; Q is —C(O)O— or —OC(O)—; Z is —$(CH_2)_y$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; and t is 2, 3, 4, 5, or 6, such that s+t is 2 to 6. The fluorinated ester compounds contain multiple fluorine chain substitutions t having a hydrolytically stable ether or thioether group. In one aspect, s is 0 or 1. In one aspect, s is 0 and the compound is a diester or branched multi-ester compound. In another aspect, t is greater than s. In another aspect, t is 3 to 6; and in another aspect, t is 3 or 4. As the number of fluorinated branches or alkyl groups increase and as the number of alkoxylate groups decrease, the compound becomes less soluble in water. In one embodiment, the fluorinated ester compound is water insoluble. In one aspect, the composition comprises a mixture of two or more different fluorinated ester compounds represented by Formula (I). In one embodiment, $R_f$ is a straight or branched perfluoroalkyl group of 4 to 12 carbon atoms, optionally interrupted by one or more —$CH_2$—, —CFH—, ether oxygens —O—, or combinations thereof; in another embodiment, $R_f$ is a straight or branched perfluoroalkyl group of 4 to 6 carbon atoms, optionally interrupted by one or more —$CH_2$—, —CFH—, ether oxygens —O—, or combinations thereof.

The alkoxylate portions of the fluorinated ester compound, which can be present in Y, Z, or A, add flexibility and hydrophilicity to the compound. In one aspect, the number of alkoxylate units (a+b and/or m+n) is 1 to 5; in another aspect, the sum of a+b and/or m+n is 1 to 3; and in a third aspect, the sum of a+b and/or m+n is 1 to 2.

The fluorinated ester compounds can be made, for example, by the esterification of a carboxylic acid compound and an alcohol compound. In one embodiment, the fluorinated ester compounds are synthesized by the esterification of a polycarboxylic acid with a fluorinated alcohol. In such a compound, Q is —C(O)O—. In one embodiment, A is only chosen as $CH_2COOH$ when Q is —C(O)O—. By the term polycarboxylic acid, it is meant that the compound has at least 2 carboxylic acid groups, such that the resulting fluorinated ester compound has a t of at least 2. Common carboxylic acids include, but are not limited to, citric acid, adipic acid, and mixtures thereof. Where citric acid is used, A is —OH; t is 3; and s is 1. Where adipic acid is used, s is 0 and t is 2. Fluorinated alcohols include but are not limited to alkoxylated versions of $C_4F_9SO_2NH(CH_2)_3OH$, $C_6F_{13}SO_2NH(CH_2)_3OH$, $C_8F_{17}SO_2NH(CH_2)_3OH$, $C_4F_9SO_2NH(CH_2)_2OH$, $C_6F_{13}SO_2NH(CH_2)_2OH$, $C_8F_{17}SO_2NH(CH_2)_2OH$, $C_4F_9SO_2N(CH_3)(CH_2)_2OH$, $C_6F_{13}SO_2N(CH_3)(CH_2)_2OH$, $C_8F_{17}SO_2N(CH_3)(CH_2)_2OH$, $C_4F_9CH_2CF_2SO_2NH(CH_2)_3OH$, $C_3F_7OCF_2CF_2SO_2NH(CH_2)_3OH$, $C_4F_9CH_2CH_2CF_2CF_2SO_2NH(CH_2)_3OH$, $C_4F_9OCFHCH_2CH_2SO_2NH(CH_2)_3OH$, $C_4F_9SO_2CH_2CH_2NH(CH_2)_3OH$, $C_6F_{13}SO_2CH_2CH_2NH(CH_2)_3OH$, $C_8F_{17}SO_2CH_2CH_2NH(CH_2)_3OH$, $C_4F_9CH_2CH_2SO_2NHCH_2CH_2OH$, $C_6F_{13}CH_2CH_2SO_2NHCH_2CH_2OH$, $C_8F_{17}CH_2CH_2SO_2NHCH_2CH_2OH$, $C_4F_9CH_2CH_2SO_2N(CH_3)CH_2CH_2OH$, $C_6F_{13}CH_2CH_2SO_2N(CH_3)CH_2CH_2OH$, $C_8F_{17}CH_2CH_2SO_2N(CH_3)CH_2CH_2OH$, $C_4F_9(CH_2)_2OH$, $C_6F_{13}(CH_2)_2OH$, $C_8F_{17}(CH_2)_2OH$, $C_4F_9OH$, $C_6F_{13}OH$, $C_8F_{17}OH$, $C_4F_9CH_2CH_2CH_2OH$, $C_6F_{13}CH_2CH_2CH_2OH$, $C_4F_9CH_2OH$, $C_6F_{13}CH_2OH$, $C_4F_9CH_2CF_2CH_2CH_2OH$, $C_6F_{13}CH_2CF_2CH_2CH_2OH$, $C_4F_9CH_2CF_2CH_2CF_2$ $CH_2CH_2$ OH, C$_6$F$_{13}$CH$_2$CF$_2$CH$_2$CF$_2$CH$_2$CH$_2$OH, C$_3$F$_7$OCF$_2$CF$_2$CH$_2$CH$_2$OH, C$_2$F$_5$OCF$_2$CF$_2$CH$_2$CH$_2$OH, CF$_3$OCF$_2$CF$_2$CH$_2$CH$_2$OH, C$_3$F$_7$(OCF$_2$CF$_2$)$_2$CH$_2$CH$_2$OH, C$_2$F$_5$(OCF$_2$CF$_2$)$_2$CH$_2$CH$_2$OH, CF$_3$(OCF$_2$CF$_2$)$_2$CH$_2$CH$_2$OH, C$_3$F$_7$OCHFCF$_2$OCH$_2$CH$_2$OH, C$_2$F$_5$OCHFCF$_2$OCH$_2$CH$_2$OH, CF$_3$OCHFCF$_2$OCH$_2$CH$_2$OH, C$_3$F$_7$OCHFCF$_2$OCH$_2$CH$_2$CH$_2$OH, C$_2$F$_5$OCHFCF$_2$OCH$_2$CH$_2$CH$_2$OH, CF$_3$OCHFCF$_2$OCH$_2$CH$_2$OH, C$_4$F$_9$CH$_2$CH$_2$SCH$_2$CH$_2$OH, C$_6$F$_{13}$CH$_2$CH$_2$SCH$_2$CH$_2$OH, C$_4$F$_9$SCH$_2$CH$_2$OH, C$_6$F$_{13}$SCH$_2$CH$_2$OH, C$_4$F$_9$CH$_2$CH$_2$CF$_2$CF$_2$CH$_2$CH$_2$OH, C$_3$F$_7$OCF(CF$_3$)C(O)NHCH$_2$CH$_2$OH, C$_3$F$_7$OCF(CF$_3$)C(O)N(CH$_3$)CH$_2$CH$_2$OH, C$_4$F$_9$NHC(O)NHCH$_2$CH$_2$OH, C$_6$F$_{13}$NHC(O)NHCH$_2$CH$_2$OH, HCF$_2$(CF$_2$)$_4$CH$_2$OH, HCF$_2$(CF$_2$)$_6$CH$_2$OH, HCF$_2$(CF$_2$)$_8$CH$_2$OH, and similar variations thereof. Mixtures of fluorinated alcohols or alkoxylated fluorinated alcohols may also be used. Such alkoxylated fluorinated alcohols can be made by reacting, for example, ethylene oxide or propylene oxide with the alcohols listed above using conventional reaction methods.

Another method for forming the fluorinated ester compounds comprises reacting a polyol with a fluorinated carboxylic acid. In such a compound, Q is —OC(O)—. By the term polyol, it is meant that the compound has at least 2 hydroxyl groups, such that the resulting fluorinated ester compound has a t of at least 2. In one embodiment, A is chosen as —CH$_2$OH only when Q is —OC(O)—. Common polyols include, but are not limited to, pentaerythritol, dipentaerythritol, alkoxylated pentaerythritol, alkoxylated dipentaerythritol, trimethylolpropane, ditrimethylolpropane, alkoxyalted trimethylolpropane, alkoxylated ditrimethylolpropane, trimethylolethane, ditrimethylolethane, alkoxylated trimethylolethane, alkoxylated ditrimethylolethane, glycerol, alkoxylated glycerol, and mixtures thereof. Alkoxylated polyols can be made by reacting, for example, ethylene oxide or propylene oxide with polyols using conventional reaction methods.

Examples of fluorinated carboxylic acids include, but are not limited to, thioether compounds, such as those made by reacting a fluorinated iodide with thiopropionic acid. Examples of fluorinated iodides include but are not limited to C$_4$F$_9$SO$_2$NH(CH$_2$)$_3$I, C$_6$F$_{13}$SO$_2$NH(CH$_2$)$_3$I, C$_8$F$_{17}$SO$_2$NH(CH$_2$)$_3$I, C$_4$F$_9$SO$_2$NH(CH$_2$)$_2$I, C$_6$F$_{13}$SO$_2$NH(CH$_2$)$_2$I, C$_8$F$_{17}$SO$_2$NH(CH$_2$)$_2$I, C$_4$F$_9$SO$_2$N(CH$_3$)(CH$_2$)$_2$I, C$_6$F$_{13}$SO$_2$N(CH$_3$)(CH$_2$)$_2$I, C$_8$F$_{17}$SO$_2$N(CH$_3$)(CH$_2$)$_2$I, C$_4$F$_9$CH$_2$CF$_2$SO$_2$NH(CH$_2$)$_3$I, C$_3$F$_7$OCF$_2$CF$_2$SO$_2$NH(CH$_2$)$_3$I, C$_4$F$_9$CH$_2$CH$_2$CF$_2$CF$_2$SO$_2$NH(CH$_2$)$_3$I, C$_4$F$_9$OCFHCH$_2$CH$_2$SO$_2$NH(CH$_2$)$_3$I, C$_4$F$_9$SO$_2$CH$_2$CH$_2$NH(CH$_2$)$_3$I, C$_6$F$_{13}$SO$_2$CH$_2$CH$_2$NH(CH$_2$)$_3$I, C$_8$F$_{17}$SO$_2$CH$_2$CH$_2$NH(CH$_2$)$_3$I, C$_4$F$_9$CH$_2$H$_2$CH$_2$SO$_2$NHCH$_2$CH$_2$I, C$_6$F$_{13}$CH$_2$CH$_2$SO$_2$NHCH$_2$CH$_2$I, C$_8$F$_{17}$CH$_2$CH$_2$SO$_2$NHCH$_2$CH$_2$I, C$_4$F$_9$CH$_2$CH$_2$SO$_2$N(CH$_3$)CH$_2$CH$_2$I, C$_6$F$_{13}$CH$_2$CH$_2$SO$_2$N(CH$_3$)CH$_2$CH$_2$I, C$_8$F$_{17}$CH$_2$CH$_2$SO$_2$N(CH$_3$)CH$_2$CH$_2$I, C$_4$F$_9$(CH$_2$)$_2$OH, C$_6$F$_{13}$(CH$_2$)$_2$I, C$_8$F$_{17}$(CH$_2$)$_2$I, C$_4$F$_9$I, C$_6$F$_{13}$I, C$_8$F$_{17}$I, C$_4$F$_9$CH$_2$CH$_2$CH$_2$I, C$_6$F$_{13}$CH$_2$CH$_2$CH$_2$I, C$_4$F$_9$CH$_2$I, C$_6$F$_{13}$CH$_2$I, C$_4$F$_9$CH$_2$CF$_2$CH$_2$CH$_2$I, C$_6$F$_{13}$CH$_2$CF$_2$CH$_2$CH$_2$I, C$_4$F$_9$CH$_2$CF$_2$CH$_2$CF$_2$CH$_2$CH$_2$I, C$_6$F$_{13}$CH$_2$CF$_2$CH$_2$CF$_2$CH$_2$CH$_2$I, C$_3$F$_7$OCF$_2$CF$_2$CH$_2$CH$_2$I, C$_2$F$_5$OCF$_2$CF$_2$CH$_2$CH$_2$I, CF$_3$OCF$_2$CF$_2$CH$_2$CH$_2$I, C$_3$F$_7$(OCF$_2$CF$_2$)$_2$CH$_2$CH$_2$I, C$_2$F$_5$(OCF$_2$CF$_2$)$_2$CH$_2$H$_2$CH$_2$I, CF$_3$(OCF$_2$CF$_2$)$_2$CH$_2$CH$_2$I, C$_3$F$_7$OCHFCF$_2$OCH$_2$CH$_2$I, C$_2$F$_5$OCHFCF$_2$OCH$_2$CH$_2$I, CF$_3$OCHFCF$_2$OCH$_2$CH$_2$I, C$_3$F$_7$OCHFCF$_2$OCH$_2$CH$_2$CH$_2$I, C$_2$F$_5$OCHFCF$_2$OCH$_2$CH$_2$CH$_2$I, CF$_3$OCHFCF$_2$OCH$_2$CH$_2$I, C$_4$F$_9$CH$_2$CH$_2$SCH$_2$CH$_2$I, C$_6$F$_{13}$CH$_2$CH$_2$SCH$_2$CH$_2$I, C$_4$F$_9$SCH$_2$CH$_2$I, C$_6$F$_{13}$SCH$_2$CH$_2$I, C$_4$F$_9$CH$_2$CH$_2$CF$_2$CF$_2$CH$_2$CH$_2$I, C$_3$F$_7$OCF(CF$_3$)C(O)NHCH$_2$CH$_2$I, C$_3$F$_7$OCF(CF$_3$)C(O)N(CH$_3$)CH$_2$CH$_2$I, C$_4$F$_9$NHC(O)NHCH$_2$CH$_2$I, C$_6$F$_{13}$NHC(O)NHCH$_2$CH$_2$I, HCF$_2$(CF$_2$)$_4$CH$_2$I, HCF$_2$(CF$_2$)$_6$CH$_2$I, HCF$_2$(CF$_2$)$_8$CH$_2$I, and similar variations thereof.

In one embodiment, Y is a C$_2$ to C$_{10}$ linear alkylene or a structure of Formulas (II), (III), or (IV):

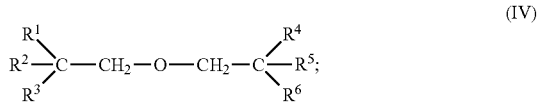

where R$^1$, R$^2$, R$^3$, R$^4$, R$^5$, and R$^6$ are independently —CH$_2$—(CH$_2$CH$_2$O)$_a$(CH$_2$CH(CH$_3$)O)$_b$—, a direct bond to A, or a direct bond to [(CH$_2$)$_x$-Q-Z—(CH$_2$)$_y$—R$_f$]; wherein a and b are defined as above. Where Y is a structure of Formula (II), the compound may be derived from pentaerythritol, alkoxylated pentaerythritol, trimethylolpropane, alkoxylated trimethylolpropane, trimethylolethane, alkoxylated trimethylolethane, or citric acid. In one embodiment, at least one of R$^1$, R$^2$, R$^3$, R$^4$ in Formula (II) is —CH$_2$—(CH$_2$CH$_2$O)$_a$(CH$_2$CH(CH$_3$)O)$_b$—; in another embodiment, at least two of R$^1$, R$^2$, R$^3$, R$^4$ in Formula (II) are —CH$_2$—(CH$_2$CH$_2$O)$_a$(CH$_2$CH(CH$_3$)O)$_b$—; and in a third embodiment, at least three of R$^1$, R$^2$, R$^3$, R$^4$ in Formula (II) are —CH$_2$—(CH$_2$CH$_2$O)$_a$(CH$_2$CH(CH$_3$)O)$_b$—.

Where Y is a structure of Formula (III), the compound may be derived from glycerol or alkoxylated glycerol. In one embodiment, at least one of R$^1$, R$^2$, R$^3$, R$^4$ in Formula (III) is —CH$_2$—(CH$_2$CH$_2$O)$_a$(CH$_2$CH(CH$_3$)O)$_b$—; and in another embodiment, at least two of R$^1$, R$^2$, R$^3$, R$^4$ in Formula (III) are —CH$_2$—(CH$_2$CH$_2$O)$_a$(CH$_2$CH(CH$_3$)O)$_b$—.

Where Y is a structure of Formula (IV), the compound may be derived from dipentaerythritol, alkoxylated dipentaerythritol, ditrimethylolpropane, alkoxylated ditrimethylolpropane, ditrimethylolethane, or alkoxylated ditrimethylolethane. In one embodiment, at least one of R$^1$, R$^2$, R$^3$, R$^4$, R$^5$, and R$^6$ in Formula (IV) is —CH$_2$—(CH$_2$CH$_2$O)$_a$(CH$_2$CH(CH$_3$)O)$_b$—; in another embodiment, at least two of R$^1$, R$^2$, R$^3$, R$^4$, R$^5$, and R$^6$ in Formula (IV) are —CH$_2$—(CH$_2$CH$_2$O)$_a$(CH$_2$CH(CH$_3$)O)$_b$—; and in a third embodiment, at least three of R$^1$, R$^2$, R$^3$, R$^4$, R$^5$, and R$^6$ in Formula (IV) are —CH$_2$—(CH$_2$CH$_2$O)$_a$(CH$_2$CH(CH$_3$)O)$_b$—.

In one aspect, one A is —OH or a C$_1$ to C$_{18}$ alkyl group. In one aspect, s is 1 and A is —OH or a C$_1$ to C$_{18}$ alkyl group. In one aspect, the alkyl group of A is chosen from C$_1$ to C$_8$; and in another aspect, the alkyl group is chosen from C$_1$ to C$_4$. In one embodiment, the carboxylic acid groups of the polycarboxylic acid or the primary hydroxyl groups of the polyol are fully reacted with the fluorinated alcohol or acid. Depending on the synthetic and isolation methods used, a mixture of inventive compounds may be formed during reaction. The inventive compounds may be isolated or may be used as a mixture of compounds. Reaction conditions such as temperature, time, and stoichiometry, for example, may be altered to increase the conversion of the carboxylic acid groups of the polycarboxylic acid or of the primary hydroxyl groups of the polyol to ester groups. The conversion rate may be monitored and tailored, for example, by NMR. This would result in a higher percentage of compounds where s=0 or 1. In one aspect, the composition comprises a mixture of fluorinated ester compounds. In another aspect, the mixture of fluorinated compounds contains at most 50% by mol of compounds where s=0; in another aspect, the mixture contains at most 40% by mol of compounds where s=0; and in a third aspect, the mixture contains at most 30% by mol of compounds where s=0.

The fluorinated ester compounds are useful as coatings additives, wherein the fluorinated ester compound can be added to a coating base, which is applied to a substrate. The fluorinated ester compound may be added directly, or may be added in the form of an aqueous dispersion, aqueous emulsion, or in organic solvent solution. In one aspect, the composition comprising a coating base in an amount of about 95 to 99.98% and the fluorinated ester compound in an amount of about 0.02 to 5% by weight, based on the total weight of the coating base and fluorinated ester compound, which equals 100%.

As noted above, the coating base is a liquid formulation of a water-dispersed coating, an epoxy polymer coating, an alkyd coating, a Type I urethane coating, or an unsaturated polyester coating, which is later applied to a substrate for the purpose of creating a lasting film on said surface. In one embodiment, the coating base is a water-dispersed coating in the form of an aqueous acrylic latex paint. The coating base includes those solvents, pigments, fillers, and functional additives found in a conventional liquid coating. Typically, the coating base may include a resin compound from 10 to 60% by weight, from 0.1 to 80% by weight of functional additives including pigments, fillers, and other additives, and the balance of the coating base composition is water or solvent. For an architectural coating, the resin compound is in an amount of about 30 to 60% by weight, functional additives including pigments, extenders, fillers, and other additives are in an amount of 0.1 to 60% by weight, with the balance being water or solvent.

The coating compositions may also include a pigment. Such a pigment may be part of the coating base formulation, or may be added subsequently. Any pigment can be used with the present invention. The term "pigment" as used herein means opacifying and non-opacifying ingredients which are particulate and substantially non-volatile in use. Pigment as used herein includes ingredients labeled as pigments, but also ingredients typically labeled in the coating trade as inerts, extenders, fillers, and similar substances.

Representative pigments that can be used with the present invention include, but are not limited to, rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, MONASTAL Blue G (C.I. Pigment Blue 15), molybdate Orange (C.I. Pigment Red 104), Toluidine Red YW (C.I. Pigment 3)-process aggregated crystals, Phthalo Blue (C.I. Pigment Blue 15)-cellulose acetate dispersion, Toluidine Red (C.I. Pigment Red 3), Watchung Red BW (C.I. Pigment Red 48), Toluidine Yellow GW (C.I. Pigment Yellow 1), MONASTRAL Blue BW (C.I. Pigment Blue 15), MONASTRAL Green BW (C.I. Pigment Green 7), Pigment Scarlet (C.I. Pigment Red 60), Auric Brown (C.I. Pigment Brown 6), MONASTRAL Green G (C.I. Pigment Green 7), MONASTRAL Maroon B, MONASTRAL Orange, and Phthalo Green GW 951.

Titanium dioxide ($TiO_2$) is the preferred pigment to use with the present invention. Titanium dioxide pigment, useful in the present invention, can be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference.

The fluorinated ester compound is effectively introduced to the coating base by thoroughly contacting, e.g., by mixing the complex compound composition with the coating base. The contacting of complex compound and coating base can be performed, for example and conveniently, at ambient temperature. More elaborate contacting or mixing methods can be employed such as using a mechanical shaker or providing heat. Such methods are generally not necessary and generally do not substantially improve the final coating composition.

The complex compound of the invention is generally added at about 0.02 weight % to about 5 weight % on a dry weight basis of the polymer compound to the weight of the wet paint. In one embodiment, from about 0.02 weight % to about 0.5 weight % is used, and in a third embodiment, from about 0.05 weight % to about 0.25 weight % of the complex compound is added to the paint.

In another embodiment, the invention is an article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound represented by Formula (I):

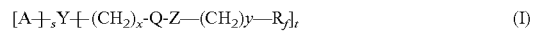

$$[A]_s-Y-[(CH_2)_x-Q-Z-(CH_2)_y-R_f]_t \qquad (I)$$

where A is independently —OH, a $C_1$-$C_{18}$ alkyl, —$CH_2OH$, —$CH_2COOH$, or $(CH_2CH_2O)_a(CH_2CH(CH_3)O)_bH$; a and b are independently 0 to 3, where a+b is 1 to 3; s is 0, 1, or 2; Y is a linear or branched alkylene organic group having t+s substitutions, optionally interrupted by ether oxygen —O— and optionally having one or more alkoxylate linking groups that bond with A or [$(CH_2)_x$-Q-Z—$(CH_2)_y$—$R_f$]; x is 0 or 1; Q is —C(O)O— or —OC(O)—; Z is —$(CH_2)_y$S— or —$(CH_2CH_2O)_m(CH_2CH(CH_3)O)_n$—; y is 2 to 6; m and n are independently 0 to 6, where m+n is 1 to 6; $R_f$ is a straight or branched perfluoroalkyl group of 2 to 20 carbon atoms, optionally interrupted by one or more —$CH_2$—, —CFH—, ether oxygens —O—, or combinations thereof; and t is 2, 3, 4, 5, or 6, such that s+t is 2 to 6.

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate. Any method of contacting a coating composition with a substrate can be used. Such methods are well known to a person skilled in the art, such as by brush, spray, roller, doctor blade, wipe, dip, foam, liquid injection, immersion or casting.

The compositions of the present invention provide performance as well as durability to coatings. They impart unexpectedly desirable surface effects such as: increased water and oil contact angles, enhanced dirt pickup resistance, and enhanced cleanability to the coating films. For these reasons, the compositions of the present invention are particularly useful in exterior coatings and paints.

Materials and Test Methods

All solvents and reagents, unless otherwise indicated, were purchased from Sigma-Aldrich, St. Louis, Mo., and used directly as supplied. WAQE is sodium lauryl sulfate, a surfactant that is available from Sigma-Aldrich. Trimethylolpropane ethoxylate (average $M_n$ 170) and pentaerythritol ethoxylate (3/4 EO/OH, average $M_n$ 270) were obtained from Sigma-Aldrich. 2-perfluorohexylethanol, perfluorohexyl iodide, and CAPSTONE FS-61 were obtained from The Chemours Company, Wilmington Del. CAPSTONE FS-61 is an ammonium salt of a partially fluorinated alcohol/$P_2O_5$ reaction product.

$C_6F_{13}CH_2CH_2(OCH_2CH_2)_2OH$, $C_6F_{13}CH_2CH_2OCH_2CH_2OH$, and the mixture of ethoxylates of 2-perfluorohexylethanol with average number of ethylene glycol units 6 were synthesized by ethoxylating 2-perfluorohexylethanol using conventional methods. Similarly, the ethoxylate of 1,1,1-tris(hydroxymethyl)propane having an average of 1 ethoxylate unit and the ethoxylate of pentaerythritol having an average ethoxylate value of 3 to 4 were synthesized by ethoxylating 1,1,1-tris(hydroxymethyl)propane and pentaerythritol, respectively, using conventional methods.

Test Methods

Dosing of Polymer Additives in Paint and Test Panel Application

Aqueous dispersions of fluoroacrylic copolymers of the present invention were added at 350 ppm fluorine levels to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Oil and Water Repellency Via Contact Angle Measurement Oil and water contact angle measurements were used to test for the migration of fluoroadditive to the surface of the paint film. Oil and water contact angle testing was performed by goniometer on 1 inch strips of Leneta panel coated with dried paint film. A Ramé-Hart Standard Automated Goniometer Model 200 employing DROPimage standard software and equipped with an automated dispensing system, 250 µl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software.

Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 µL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-up Resistance (DPR) Test for Exterior Paints

DPR testing was used to evaluate the ability of the painted panels to prevent dirt accumulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 h for thorough mixing and stored in a decicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*_{initial} - L^*_{dusted})$. A lower $\Delta L^*$ value indicates better dirt pick-up resistance.

Test Method 3. Leneta Oil Stain Cleanability for Interior Paints

A modified version of ASTMD3450 was used to determine the oil stain cleanability of painted panels. The test material dosed in interior flat paint was applied to a black Leneta card as described in the application method. The dried samples were cut into a 4"×3" size for testing. A thin, evenly laid layer of Leneta staining medium (5 wt. % dispersion of Leneta carbon black in Vaseline®) was placed on half of the film, and left for 1 hour. The excess stain was gently scrapped off and wiped with a clean paper towel until no visible stain could be wiped off. The panel was then moved to an Gardco abrasion tester covered with 8 layers of cheese cloth at the washing block. The cheesecloth was moisturized with 10 mL of 1% mild detergent solution in water and performed washability via moving the washing block over the stained panel. After 5 cycles, the panel was rinsed with deionized water and left to dry for 12 hours. The whiteness of the unwashed stained paint and washed stained paint were measured using a Hunter lab colorimeter to obtain L values. Cleanability was calculated as per the equation: Cleanability=$(L_{washed\ paint}-L_{unwashed\ stained\ paint})\times 10/(L_{unstained\ paint}-L_{unwashed\ stained\ paint})$. Similarly a cleanability rating for a control sample that is devoid of fluorinated additive was accessed simultaneously. The difference between the cleanability rating of the sample to the control were determined and represented as a cleanability score $\Delta C$. The higher the $\Delta C$ the better the performance, suggesting that relatively lower amounts of stain remains on the treated sample compared to control. A negative $\Delta C$ indicates that the sample is worse than the control.

Test Method 4. Weathering (WOM) for DPR and Oil Contact Angle Durability

Accelerated weathering of coated Q-panels was performed in an ATLAS Ci5000 Xenon Lamp Weather-o-Meter. The Xenon lamp was equipped with Type S Boro Inner and Outer Filters. Weathering cycles were performed according to D6695, cycle 2. During the weathering period, the panels were subjected to repeated 2-hour programs, which included 18 minutes of light and water spray followed by 102 minutes of light only. During the entire program, panels were held at 63° C. and during the UV only segment relative humidity was held at 50%.

For a 24-hour WOM program, freshly coated aluminum Q-panels were allowed to air dry for 7-days. The initial whiteness (L*initial) of each Q-panel was measured using a Hunter Lab colorimeter. One set of panels was subjected to DPR testing (as per Test Method 2) as well as oil and water contact angle testing (as per Test Method 1). A duplicate set of panels was placed in the weather-o-meter and allowed to proceed through 12 continuous 2-hour cycles according to the description above. After completion of the weathering cycles, the panels were dried, evaluated according to Test Methods 1 and 2, and re-subjected to DPR.

EXAMPLES

Preparation 1

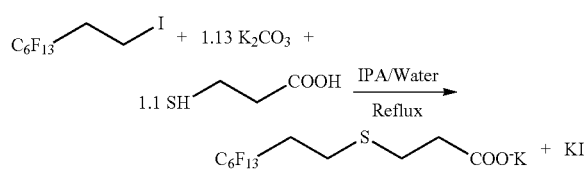

A 1 liter flask was equipped with a thermocouple, mechanical stirring, reflux condenser, nitrogen inlet, and addition funnel. The reactor flask was charged with perfluorohexyl iodide (173 g), isopropanol (158 g), and thiopropionic acid (42.7 g), and the mixture was heated to reflux at 80° C. An aqueous $K_2CO_3$ solution (57 g in 83.5 g water) was added dropwise while maintaining a temperature of 80° C. The mixture was held at reflux for an additional 5.5 hrs until none of the starting iodide could be detected. The mixture was cooled to below 40° C. and gradually neutralized with an aqueous solution of HCl (41 g in 220 g of water). The mixture was stirred for an additional 15 minutes at 50° C. The organic material was extracted and solvent was removed by distillation.

Comparative Example A

A calculated amount of CAPSTONE FS-61 (350 ppm F) was used side by side with examples for testing on both exterior and interior paints as per the test methods described.

Comparative Example B

Interior paint with no additive was tested according to the test methods described.

Comparative Example C

Exterior paint with no additive was tested according to the test methods described.

Example 1

To a 50-mL flask equipped with a short condenser were added the compound of $C_6F_{13}CH_2CH_2(OCH_2CH_2)_2OH$ (10 g, 22 mmol), citric acid (2.9 g, 15.1 mmol), and boric acid (0.01 g, 0.16 mmol). The resultant mixture was heated for 2 hours at 127° C. to give a viscous clear liquid of fluorinated citrate. To a 20-mL scintillation vial were added deionized water (10 g), the fluorinated citrate (2.0 g, 3.7 mmol) and lysine (0.63 g, 4.3 mmol). The mixture was stirred for 30 minutes to give a colorless solution. The pH was measured as 8.0.

TABLE 1

Performance of Example 1 in Interior Paint

| Example | Cleanability Rating* | Water Contact Angle** | Oil Contact Angle** |
|---|---|---|---|
| 1 | 7.6 | 59 | 83 |
| B | 2.6 | 73 | 0 |

*A higher number indicates better performance.
**A higher number indicates better performance.

Example 2

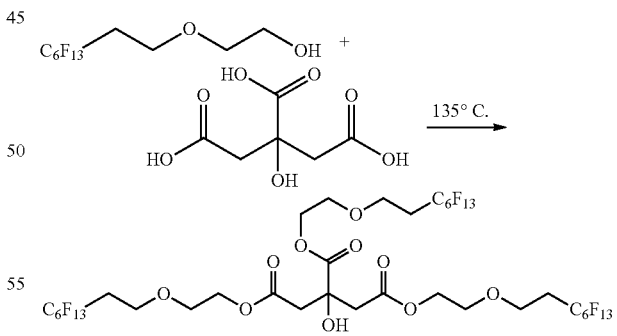

To a 50-mL flask equipped with a short condenser were added the compound of $C_6F_{13}CH_2CH_2OCH_2CH_2OH$ (19.0 g, 46.6 mmol) and citric acid (3.0 g, 15.6 mmol). The resultant mixture was heated for 3 hours at 135° C. All the solids dissolved to give a trisubstituted fluorinated ester as a viscous clear liquid. To a 250-mL flask was added the trisubstituted fluorinated ester (10 g) and a solution of WAQE surfactant (1.2 g, 33% solids) in deionized water (38.8 g). The resultant solution was stirred and heated to 65°

C. for 10 minutes. Then the mixture was transferred to 100-mL plastic cup and sonicated twice for 2 minutes each to give a stable aqueous dispersion.

Example 3

To a 50 mL flask were added $C_6F_{13}CH_2CH_2(OCH_2CH_2)_2OH$ (9.85 g, 21.8 mmol) and adipic acid (1.6 g, 10.9 mmol). The resultant mixture was heated for 40 hours at 160° C. A viscous yellow liquid fluorinated adipate was obtained. To a 100-mL flask was added the fluorinated adipate material from above (7.5 g) and 1% wt. aqueous solution of sodium lauryl sulfate (30 g). The resultant solution was stirred and heated at 65° C. for 10 minutes. The resultant mixture was sonicated to give a stable dispersion (approximately 20% of solid content).

Example 4

To a 50 mL flask were added a mixture of ethoxylates of 2-perfluorohexylethanol with average number of ethylene glycol units 6 (15 g, 26 mmol) and citric acid (1.67 g, 8.7 mmol). The resultant mixture was heated for 90 hours at 150° C. A viscous fluorinated citrate was obtained. To a 100-mL flask was added the fluorinated citrate material from above (10.0 g) and a 1% wt. aqueous solution of sodium lauryl sulfate (40 g). The resultant solution was stirred, heated at 65° C. for 10 minutes, and sonicated to give a dispersion (approximately 20% of solid content).

Example 5

To a 50 mL flask equipped with a short condenser were added a mixture of ethoxylates of 2-perfluorohexylethanol with average number of ethylene glycol units 6 (15 g, 26 mmol) and adipic acid (1.9 g, 13 mmol). The resultant mixture was heated for 70 hours at 160° C. A viscous fluorinated adipate was obtained. To a 100-mL flask was added the fluorinated adipate material from above (10.0 g) and a 1% wt. aqueous solution of sodium lauryl sulfate (40 g). The resultant solution was stirred, heated to 70° C. for 15 minutes, and sonicated to give a dispersion (approximately 20% of solid content).

Example 6

Example 6 represents a similar synthesis to Example 2, using conditions to maximize the conversion of acid groups to ester groups, such that the final composition contains a higher percentage of compounds where s=0. To a 50 mL flask were added $C_6F_{13}CH_2CH_2OCH_2CH_2OH$ (9.0 g, 22.0 mmol), citric acid (1.42 g, 7.4 mmol). The resultant mixture was heated for 80 hours at 150° C. A viscous fluorinated citrate was obtained. To a 100-mL flask was added the fluorinated citrate material from above (7.5 g) and a 1% wt. aqueous solution of sodium lauryl sulfate (30 g). The resultant solution was stirred, heated to 65° C. for 10 minutes, and sonicated to give a stable dispersion (approximately 20% of solid content).

Example 7

To a 50 mL flask were added $C_6F_{13}CH_2CH_2(OCH_2CH_2)_2OH$ (15 g, 33.2 mmol) and citric acid (2.12 g, 11.0 mmol). The resultant mixture was heated for 72 hours at 150° C. A viscous liquid fluorinated citrate was obtained. To a 100-mL flask was added the fluorinated citrate material from above (10 g) and a 1% wt. aqueous solution of sodium lauryl sulfate (40 g). The resultant solution was stirred and heated to 65° C. for 10 minutes. Then the resultant mixture was sonicated to give a stable dispersion (approximately 20% of solid content).

TABLE 2

Performance of Examples 2-6 in Exterior Paint

| | DPR (ΔL)* | | | Oil Contact Angle** | | |
|---|---|---|---|---|---|---|
| Ex. | Initial | 1 day WOM | 3 day WOM | Initial | 1 day WOM | 3 day WOM |
| 2 | 1.6 | 4.4 | 5.2 | 86 | 50 | 24 |
| 3 | 9.25 | 4.59 | 5.36 | 21 | 31 | 29 |
| 4 | 5.95 | 3.82 | 5.95 | 72 | 47 | 0 |
| 5 | 9.01 | 4.47 | 6.72 | 39 | 39 | 15 |
| 6 | 2.91 | 2.07 | 2.25 | 74 | 67 | 63 |
| 7 | 3.38 | 2.42 | 3.49 | 74 | 63 | 45 |
| A | 1.0 | 4.5 | 4.6 | 86 | 52 | 40 |
| C | 9.8 | 7.5 | 7.5 | 8 | 0 | 0 |

*A lower number indicates better performance.
**A higher number indicates better performance.

Example 8

A duel neck vacuum distillation flask was equipped with a thermocouple, stir bar, and vacuum distillation head. The reactor was charged $C_6F_{13}CH_2CH_2SCH_2CH_2COOH$ (18.4 g), 1,1,1-tris(hydroxymethyl)propane (1.65 g), and toluene sulfonic acid monohydrate (0.25 g). The mixture was heated to 150° C. for about 7 hours while the pressure was lowered to 13-15 mmHg. The mixture was cooled and discharged. A portion of the reaction product (5 g) was dissolved in methylisobutylketone (MIBK, 15.0 g) and then combined with water (15 g) and WAQE surfactant (15 g) in a plastic beaker. This mixture was then heated briefly to 60-70° C., sonicated, and distilled to remove organic solvent. The finished liquid had a mass of about 18.3 gms.

Example 9

Example 8 was repeated, with the following amounts of starting material: $C_6F_{13}CH_2CH_2SCH_2CH_2COOH$ (36.8 g), 1,1,1-tris(hydroxymethyl)propane (2.8 g), and toluene sulfonic acid monohydrate (0.6 g).

TABLE 3

Performance of Examples 8 and 9 in Exterior Paint

| | | Example | |
|---|---|---|---|
| | | 8 | 9 |
| DPR (ΔL)* | Initial | 1.05 | 0.99 |
| | 1 day WOM | 1.63 | 1.49 |
| | 3 day WOM | 1.89 | 2.15 |
| Water Contact Angle** | Initial | 114 | 114 |
| | 1 day WOM | 109 | 109 |
| | 3 day WOM | 107 | 107 |
| Oil Contact Angle** | Initial | 84 | 83 |
| | 1 day WOM | 69 | 70 |
| | 3 day WOM | 67 | 63 |

*A lower number indicates better performance.
**A higher number indicates better performance.

Example 10

A 2-neck 50-ml flask was equipped with a thermocouple, an insulated short path distillation column, and magnetic stirring. A nitrogen inlet needle was placed in the system before the condenser. The reactor was charged with $C_6F_{13}CH_2CH_2SCH_2CH_2COOH$ (23.7 g), trimethylolpropane ethoxylate (average $M_n$ 170, 2.8 g), and toluene sulfonic acid monohydrate (0.3 g). The reaction was heated to 160° C. and held for 6-7 hours to yield a product of 24 g. A portion of the reaction product (5 g) was suspended in water (10 g) with WAQE (0.15 g) and MIBK (5.0 g). This mixture was shaken, heated briefly to 50-60° C., and sonicated. Water (10 g) was added and the mixture was distilled at reduced pressure to yield 14.8 g.

TABLE 3

Performance of Examples 10-13 in Exterior Paint

| Ex. | DPR (ΔL)* | | | Oil Contact Angle** | | |
|---|---|---|---|---|---|---|
| | Initial | 1 day WOM | 3 day WOM | Initial | 1 day WOM | 3 day WOM |
| 10 | 1.46 | 0.88 | 1.62 | 89 | 82 | 63 |
| 11 | 1.4 | 5.5 | 8 | | | |
| 12 | 8.8 | 8 | 7.8 | | | |
| 13 | 3.8 | 5 | 4.9 | | | |

*A lower number indicates better performance.
**A higher number indicates better performance.

Example 11

A 100-mL 2-neck flask was equipped with a thermocouple, magnetic stir bar, and a short path distillation head with a vacuum take off adaptor. The reactor was charged with $C_6F_{13}CH_2CH_2SCH_2CH_2COOH$ (25.80 g), pentaerythritol (2.04 g), and toluene sulfonic acid (0.33 g). The flask was heated to 140° C. for 1 hour and then the pressure was gradually reduced to 12.3 mmHg. The reaction was held for an additional hour at 140° C., cooled, and dissolved MIBK (27 g) to yield 26.6 g. The reaction product (30 g) was dissolved in MIBK (30 g) and then charged with water (30 g) and WAQE (0.45 g). This mixture was warmed briefly to 50° C., sonicated, diluted further with water (15-25 mL), and distilled to yield 56 g.

Example 12

A 100-mL 2-neck flask was equipped with a thermocouple, magnetic stir bar, and a short path distillation head with a vacuum take off adaptor. The reactor was charged with $C_6F_{13}CH_2CH_2SCH_2CH_2COOH$ (12.90 g), dipentaerythritol (1.27 g), and toluene sulfonic acid (0.09 g). The flask was heated to 150° C. for 1 hour and then the pressure was gradually reduced to 23 mmHg. The reaction was held for an additional hour at 140° C. and cooled to yield 13.3 g. The reaction product (13.3 g) was dissolved in MIBK (13.3 g), and 21 g of the resulting solution was then charged with water (20.7 g) and WAQE (0.36 g). This mixture was warmed briefly to 50° C., sonicated, diluted further with water (15-25 mL), and distilled to yield 52 g.

Example 13

A 100-mL 2-neck flask was equipped with a thermocouple, magnetic stir bar, and a short path distillation head with a vacuum take off adaptor. The reactor was charged with $C_6F_{13}CH_2CH_2SCH_2CH_2COOH$ (17.17 g), pentaerythritol ethoxylate (3/4 EO/OH, average $M_n$ 270, 2.7 g), and toluene sulfonic acid (0.22 g). The flask was heated to 150° C. for 1 hour and then the pressure was gradually reduced to 23 mmHg. The reaction was held for an additional hour at 140° C. and cooled to yield 19.3 g. The reaction product (19.3 g) was dissolved in MIBK (19.3 g), and 10 g of the resulting solution was then charged with water (10 g) and WAQE (0.30 g). This mixture was warmed briefly to 50° C., sonicated, diluted further with water (7 g), and distilled to yield 20 g.

What is claimed is:

1. A composition comprising (a) a coating base selected from a water-dispersed coating, an epoxy polymer coating, an alkyd coating, a Type I urethane coating, or an unsaturated polyester coating; and (b) a fluorinated ester compound represented by formula (I):

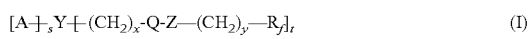

where
A is independently —OH, a $C_1$-$C_{18}$ alkyl, —$CH_2OH$, —$CH_2COOH$, or $(CH_2CH_2O)_a(CH_2CH(CH_3)O)_bH$;
a and b are independently 0 to 3, where a+b is 1 to 3;
s is 0, 1, or 2;
Y is a linear or branched alkylene organic group having t+s substitutions, optionally interrupted by ether oxygen —O— and optionally having one or more alkoxylate linking groups that bond with A or [$(CH_2)_x$-Q-Z-$(CH_2)_y$-$R_f$];
x is 0 or 1;
Q is —C(O)O— or —OC(O)—;
Z is —$(CH_2)_y$S— or —$(CH_2CH_2O)_m(CH_2CH(CH_3)O)_n$—;
y is 2 to 6;
m and n are independently 0 to 6, where m+n is 1 to 6;
$R_f$ is a straight or branched perfluoroalkyl group of 2 to 20 carbon atoms, optionally interrupted by one or more —$CH_2$—, —CFH—, ether oxygens —O—, or combinations thereof; and
t is 2, 3, 4, 5, or 6, such that s+t is 2 to 6.

2. The composition of claim 1, wherein the composition comprises (a) the coating base in an amount of from about 95 to 99.98% and (b) the fluorinated ester compound in an amount of from about 0.02 to 5% by weight, based on the total weight of (a) and (b).

3. The composition of claim 1, where A is OH or $C_1$ to $C_4$ alkyl.

4. The composition of claims 1, where s is 0 or 1.

5. The composition of claim 1, where t is 3 or 4.

6. The composition of claim 1, where Y is a $C_2$ to $C_{10}$ linear alkylene or a structure of formulas (II), (III), or (IV):

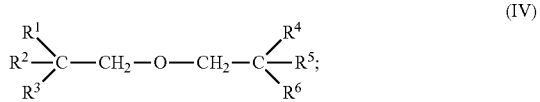

where $R^1$, $R^2$, $R^3$, $R^4$, $R^5$, and $R^6$ are independently —$CH_2$—$(CH_2CH_2O)_a(CH_2CH(CH_3)O)_b$—, a direct bond to A, or a direct bond to [$(CH_2)_x$-Q-Z-$(CH_2)_y$-$R_f$]; wherein a and b are defined as above.

7. The composition of claim 1, where the fluorinated ester compound (b) is water insoluble.

8. The composition of claims 1, where the coating base is a water-dispersed coating in the form of an aqueous acrylic latex paint.

9. The composition of claim 1, where the coating base comprises an additive selected from $TiO_2$, clays, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fibers, glass powders, glass spheres, blue pigments, red pigments, yellow pigments, orange pigments, process aggregated crystals, brown pigments, or green pigments.

10. An article comprising a substrate and a dried coating thereon, where the dried coating results from drying a composition comprising (a) a coating base selected from a water-dispersed coating, an epoxy polymer coating, an alkyd coating, a Type I urethane coating, or an unsaturated polyester coating; and (b) a fluorinated ester compound represented by formula (I):

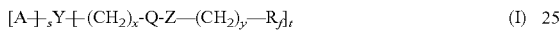

where

A is independently —OH, a $C_1$-$C_{18}$ alkyl, -$CH_2OH$, -$CH_2COOH$, or $(CH_2CH_2O)_a(CH_2CH(CH_3)O)_bH$;

a and b are independently 0 to 3, where a+b is 1 to 3;

s is 0, 1, or 2;

Y is a linear or branched alkylene organic group having t+s substitutions, optionally interrupted by ether oxygen —O— and optionally having one or more alkoxylate linking groups that bond with A or [$(CH_2)_x$-Q-Z-$(CH_2)_y$-$R_f$];

x is 0 or 1;

Q is —C(O)O— or —OC(O)—;

Z is —$(CH_2)_y$S— or —$(CH_2CH_2O)_m(CH_2CH(CH_3)O)_n$—;

y is 2 to 6;

m and n are independently 0 to 6, where m+n is 1 to 6;

$R_f$ is a straight or branched perfluoroalkyl group of 2 to 20 carbon atoms, optionally interrupted by one or more —$CH_2$—, —CFH—, ether oxygens —O—, or combinations thereof; and t is 2, 3, 4, 5, or 6, such that s+t is 2 to 6.

11. The article of claim 10, where Y is a $C_2$ to $C_{10}$ linear alkylene or a structure of formulas (II), (III), or (IV):

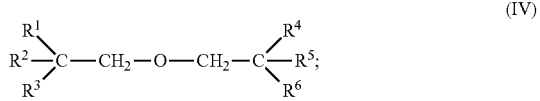

where $R^1$, $R^2$, $R^3$, $R^4$, $R^5$, and $R^6$ are independently —$CH_2$—$(CH_2CH_2O)_a(CH_2CH(CH_3)O)_b$—, a direct bond to A, or a direct bond to [$(CH_2)_x$-Q-Z-$(CH_2)_y$-$R_f$]; wherein a and b are defined as above.

12. The article of claim 10, wherein the composition comprises (a) the coating base in an amount of from about 95 to 99.98% and (b) the fluorinated ester compound in an amount of from about 0.02 to 5% by weight, based on the total weight of (a) and (b).

13. The article of claims 10, where A is OH or $C_1$ to $C_4$ alkyl.

14. The article of claims 10, where the coating base is a water-dispersed coating in the form of an aqueous acrylic latex paint.

15. The article of claims 10, where the substrate is selected from the group consisting of wood, metal, wallboard, masonry, concrete, fiberboard, and paper.

* * * * *